(No Model.)
R. LYONS.
HARROW FOR LISTED CORN.
No. 481,634. Patented Aug. 30, 1892.
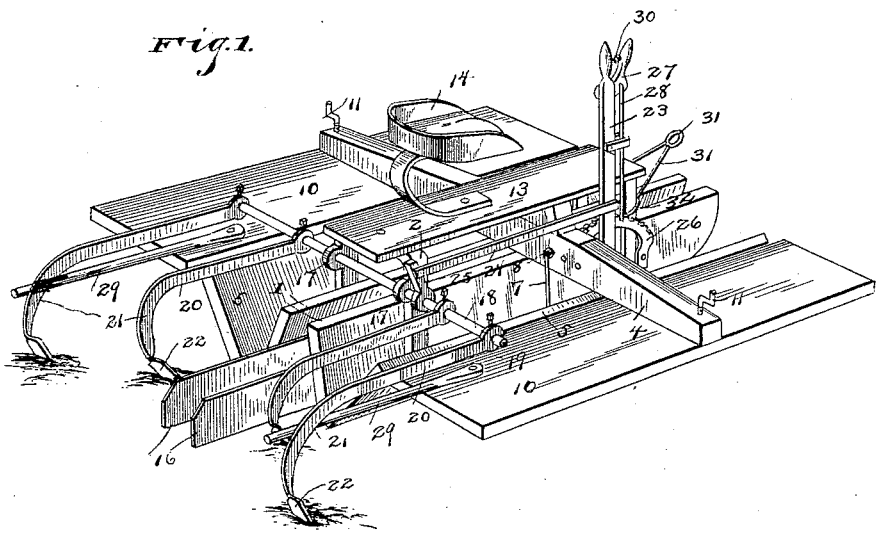
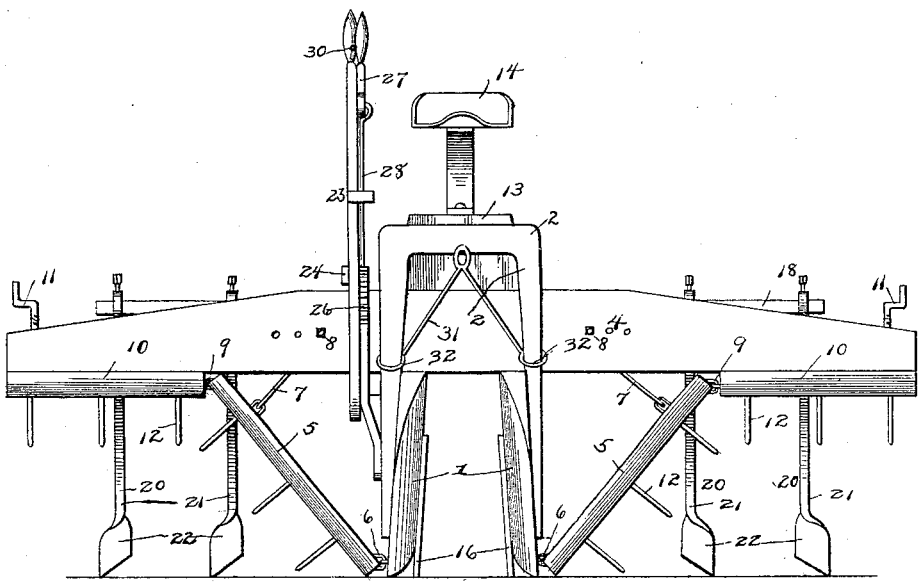
Witnesses
B. S. Ober.
M. Siggers.
Inventor
Robert Lyons,
By his Attorneys,
C. A. Snow & Co.

UNITED STATES PATENT OFFICE.

ROBERT LYONS, OF PEIRO, IOWA.

HARROW FOR LISTED CORN.

SPECIFICATION forming part of Letters Patent No. 481,634, dated August 30, 1892.

Application filed March 15, 1892. Serial No. 424,993. (No model.)

*To all whom it may concern:*

Be it known that I, ROBERT LYONS, a citizen of the United States, residing at Peiro, in the county of Woodbury and State of Iowa, have invented a new and useful Harrow for Listed Corn, of which the following is a specification.

My invention relates to improvements in combined harrows and cultivators, the objects in view being to provide a harrow and cultivator combined and adapted to operate upon listed corn; to provide means for adjusting the cultivator-teeth so as to penetrate deep or shallow and for throwing them into and out of operative position; to provide for a protection of the young corn from the dirt thrown by the shovels of the cultivators, and for a clearance of the cultivators of trash, stalks, and other débris collected by the same during their operation.

With these and other objects in view the invention consists in certain features of construction hereinafter specified, and particularly pointed out in the claim.

Referring to the drawings, Figure 1 is a perspective of a combined harrow and cultivator adapted for listed corn and constructed in accordance with my invention. Fig. 2 is an end elevation.

Like numerals of reference indicate like parts in both figures of the drawings.

In practicing my invention, I employ a pair of runners 1, which converge toward their upper edges, have their lower front ends rounded or flared, and are connected and embraced by front and rear inverted-U-shaped arches 2 and 3, respectively. Between these arches the runners are traversed by a transverse beam 4, which extends at each side of the runners.

To the outer sides of the runners, near their lower edges, wings 5 are hinged, as at 6, said wings 5 being inclined upwardly, as shown. Brace-rods 7 are loosely connected to the wings and have their upper ends bent to form eyes for bolts 8, connected with opposite series of perforations formed in the transverse beam 4 at opposite sides of the runners. By arranging these bolts in the various openings it will be obvious that the inclination of the aforesaid wings may be changed at pleasure.

Hinged, as at 9, to the upper edges of the wings 5 are horizontal wings 10, and passing loosely through the extremities of the beam 4 are hand-screws 11, which bear upon the upper sides of the wings 10 and are adapted to adjust the same. The wings 5 and 10 have their under sides studded with harrow-teeth 12, the same being staggered, as is usual.

A platform 13 is supported upon the beam 4 and the two arches 3, and upon this is located a seat 14 for the driver.

Pivoted, as at 15, to the rear ends and at the inner sides of the runners 1 is a pair of fenders 16, the same being loosely connected and adapted to ride lightly over the ground at the rear end of the machine.

Transversely-opposite bearings 17 are located at the rear side of the arch 3, and in the same is journaled a transversely-disposed rock-shaft 18. The shaft is preferably round and passes through round eyes 19, formed at the forward ends of opposite pairs of cultivator-beams 20, a pair being located at each side of the center of the shaft. Each of the beams has its rear end downwardly-curved to form a standard 21, the inner pair of beams being shorter and terminating in advance of the outer pair, and the four beams carry cultivator-shovels 22, secured at the lower ends of their standards, the said shovels being given a disposition as will direct the soil inward or toward the fenders.

At one side of one of the runners a lever 23 is fulcrumed, and the same is adjustably connected by a connecting-rod 24 to a rock-arm 25, extending from the rock-shaft, so that through a manipulation of the lever the rock-shaft may be oscillated and the beams raised and lowered to and from an operative position or set at any depth of penetration. At one side of the lever just mentioned there is also secured to the runner, upon which the lever is fulcrumed, a curved-tooth locking-standard 26. A bell-crank lever 27 is pivoted to the hand-lever for operating the rock-shaft, and a plunger or locking bolt 28 extends downwardly from the bell-crank lever, and at its lower end engages with the teeth of the aforesaid locking-standard. The plunger is normally maintained in such engagement through the medium of a coiled spring 30.

To the rear ends of the wings 10 there are bolted rearwardly-disposed trash-clearing bars 29, such a bar extending between each pair of cultivator-beams, as shown. A draft-bail 31 terminates in eyes 32, which latter loosely embrace the opposite vertical portions of the front arch 2 of the machine. These eyes are adapted for vertical movement upon the arch, and in this manner may the draft-bail automatically adjust itself to a proper height for the line of draft.

In operation the wings are adjusted so as to fit or approximate the opposite sides and tops of the ridges at each side of the furrow, the runners taking at each side of the row of young corn. The driver then manipulates the lever so as to lower the cultivator-shovels to a proper depth into the ground and starts the team. The dirt thrown by the shovels is taken from the sides of the ridges and cast toward the young corn, being prevented from covering the same by the fenders which ride loosely over the surface of the soil at the sides of the corn. At the same time the staggered teeth of the harrow-wings serve to finely pulverize the soil at the sides and top of the ridge, should the shovels become clogged by accumulations of cornstalks, weeds, grass, &c. In order to clear the same of such obstructions, it is simply necessary to swing the lever to the front and thus raise the beams and their shovels. The trash will be prevented from rising with the shovels by means of the clearing-rods, before mentioned as extending rearwardly from the horizontal wings 10, between the shovels of each pair.

Having described my invention, what I claim is—

In a combined harrow and cultivator, the combination, with the harrow-section, of the transverse rock-shaft journaled thereon, means for oscillating the rock-shaft, cultivator-bars extending rearwardly from and secured rigidly upon the rock-shaft and terminating in downwardly-disposed shovel-carrying standards, and the clearance rods or bars extending rearwardly from the harrow at the sides of the standards, substantially as specified.

In testimony that I claim the foregoing as my own I have hereto affixed my signature in the presence of two witnesses.

ROBERT LYONS.

Witnesses:
D. W. WILSEY,
JAMES MARLETT.